(12) United States Patent
Hoogerbrugge et al.

(10) Patent No.: US 8,578,104 B2
(45) Date of Patent: Nov. 5, 2013

(54) MULTIPROCESSOR SYSTEM WITH MIXED SOFTWARE HARDWARE CONTROLLED CACHE MANAGEMENT

(75) Inventors: Jan Hoogerbrugge, Helmond (NL); Andrei Sergeevich Terechko, Eindhoven (NL)

(73) Assignee: NXP, B.V., Eindhoven (NL)

( * ) Notice: Subject to any disclaimer, the term of this patent is extended or adjusted under 35 U.S.C. 154(b) by 476 days.

(21) Appl. No.: 12/999,450

(22) PCT Filed: Jun. 9, 2009

(86) PCT No.: PCT/IB2009/052441
§ 371 (c)(1),
(2), (4) Date: Dec. 16, 2010

(87) PCT Pub. No.: WO2009/153703
PCT Pub. Date: Dec. 23, 2009

(65) Prior Publication Data
US 2011/0093661 A1    Apr. 21, 2011

(30) Foreign Application Priority Data
Jun. 17, 2008  (EP) ................................. 08158440
Jun. 9, 2009   (WO) ................. PCT/IB2009/052441

(51) Int. Cl.
*G06F 12/00*        (2006.01)
(52) U.S. Cl.
USPC ........... 711/143; 711/147; 711/156; 717/141; 717/149; 717/151
(58) Field of Classification Search
USPC ........... 711/143, 147, 156; 717/141, 149, 151
See application file for complete search history.

(56) References Cited

U.S. PATENT DOCUMENTS

| | | | | |
|---|---|---|---|---|
| 5,347,648 A | * | 9/1994 | Stamm et al. | 714/5.11 |
| 6,049,866 A | * | 4/2000 | Earl | 712/227 |
| 6,094,709 A | | 7/2000 | Baylor | |
| 6,351,790 B1 | * | 2/2002 | Jones | 711/141 |
| 6,546,467 B2 | * | 4/2003 | Farrall et al. | 711/146 |

(Continued)

FOREIGN PATENT DOCUMENTS

EP    2 028 595 A1 *  2/2009

OTHER PUBLICATIONS

"Cache Touch Stack", IBM Technical Disclosure Bulletin, IBM Corp, vol. 37, No. 6A, pp. 77-78 (Jun. 1994).

(Continued)

*Primary Examiner* — Stephen Elmore

(57) ABSTRACT

A multiprocessor system has a background memory and a plurality of processing elements, each comprising a processor core and a cache circuit. The processor cores execute programs of instructions and the cache circuits cache background memory data accessed by the programs. A write back monitor circuit is used to buffer write addresses used for writing data by at least part of the processor cores. The programs contain commands to read the buffered write back addresses from the write back monitor circuit and commands from the programs to invalidate cached data for the write back addresses read by the commands to read the buffered write back addresses. Thus cache management is performed partly by hardware and partly by the program that uses the cache. The processing core may be a VLIW core, in which case instruction slots that are not used by the program can be made useful to include instructions for cache management.

15 Claims, 4 Drawing Sheets

(56) References Cited

U.S. PATENT DOCUMENTS

| | | | |
|---|---|---|---|
| 6,564,302 B1 | 5/2003 | Yagi et al. | |
| 6,665,767 B1* | 12/2003 | Comisky et al. | 711/3 |
| 7,136,969 B1 | 11/2006 | Niver et al. | |
| 8,392,663 B2* | 3/2013 | Kinter et al. | 711/141 |
| 2002/0083271 A1 | 6/2002 | Mounes-Toussi | |
| 2004/0088495 A1 | 5/2004 | Glasco et al. | |
| 2007/0186048 A1* | 8/2007 | Nakanishi et al. | 711/137 |
| 2011/0099337 A1* | 4/2011 | Hoogerbrugge et al. | 711/143 |

OTHER PUBLICATIONS

Woo, S., et al "The SPLASH-2 Programs: Characterization and Methodological Considerations," To appear in Proc. of the 22$^{nd}$ Annual Int'l. Symp. on Computer Architecture, 13 pgs. (Jun. 1995).

Lee, H., et al "Eager Writeback—A Technique for Improving Bandwidth Utilization," Proc. of the 33$^{rd}$ Intl. Symp. on Microarchitecture, pp. 11-21 (Dec. 2000).

van der Tol, E., et al, "Mapping of H.264 Decoding on a Multiprocessor Architecture," SPIE Conf. on Image and Video Communications and Processing, vol. 5022, pp. 707-718 (2003).

van de Waerdt, J., et al, "The TM3270 Media-processor Data Cache", Proc. of the 2005 Int'l. Conf. on Computer Design, 8 pgs. (2005).

van de Waerdt, Jan-Willem, et al, "The TM3270 Media-processor", Proc. of the 38th Annual IEEE/ACM Int'l. Symp. on Microarchitecture, 12 pgs. (2005).

Bellens, P., et al "CellSs: A Programming Model for the Cell BE Architecture", Proc. of the 2006 ACM/IEEE SC|06 Conference, 11 pages (Nov. 2006).

Sarangi, S., et al "Phoenix: Detecting and Recovering from Permanent Processor Design Bugs with Programmable Hardware," Proc. of the 39$^{th}$ Int'l. Symp. on Microarchitecture, 12 pgs. (Dec. 2006).

Adve, S., et al "Shared Memory Consistency Models: A Tutorial", Western Research Laboratory report WRL-95, 32 pages (Dec. 2006).

International Search Report and Written Opinion for Int'l Patent Appln. No. PCT/IB2009/052441 (Sep. 4, 2009).

\* cited by examiner

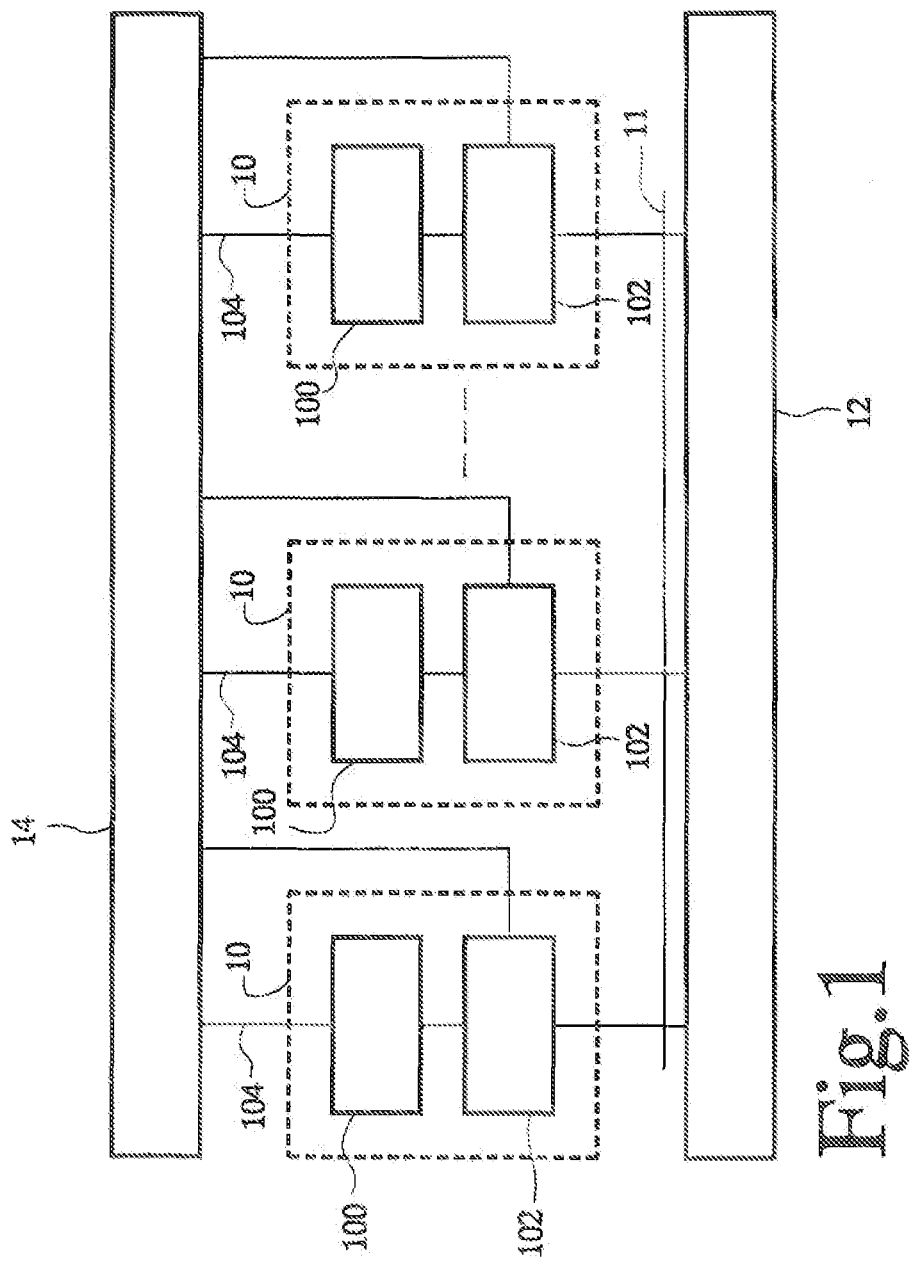

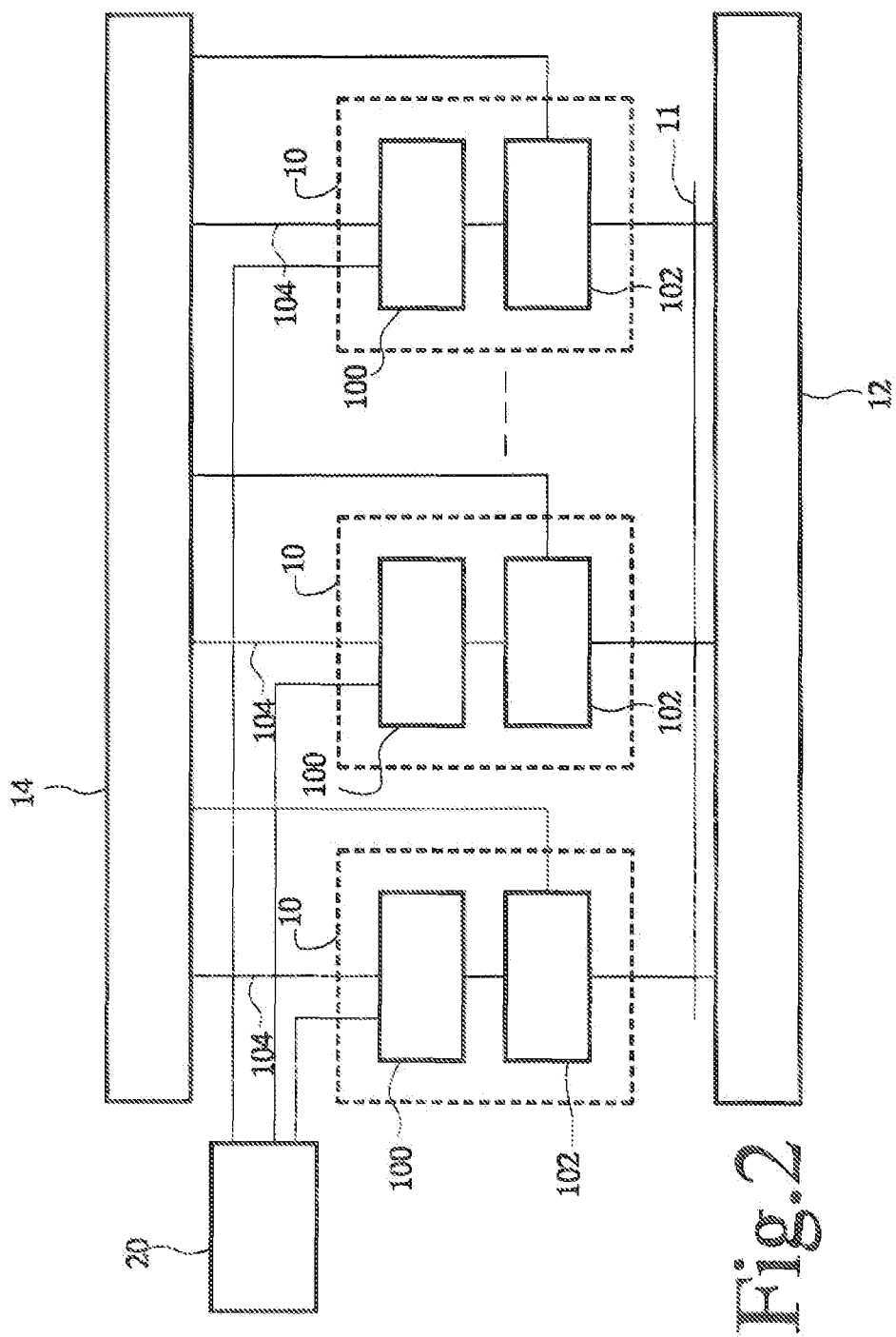

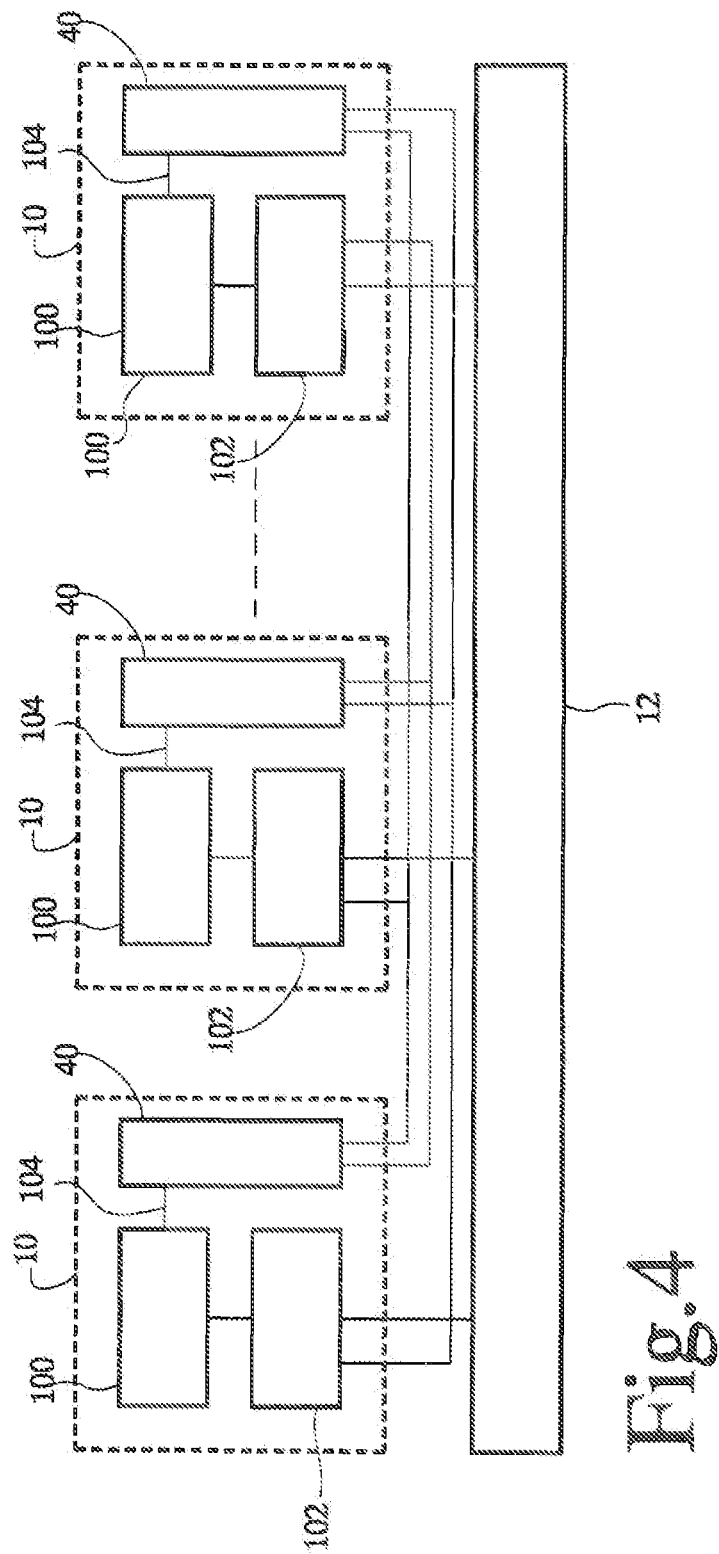

MULTIPROCESSOR SYSTEM WITH MIXED SOFTWARE HARDWARE CONTROLLED CACHE MANAGEMENT

FIELD OF THE INVENTION

The invention relates to a multiprocessor system with cache memories, to a method of operating a multiprocessing system and to a compiler for such a multiprocessor system.

BACKGROUND OF THE INVENTION

It is known to provide cache memories between respective processors of a multiprocessor system and a shared background memory. The cache memories store copies of data associated with selected addresses in the background memory. A major concern in such a system is the maintenance of consistency between the copies. When one processor updates data for a background memory address in its cache memory or in the background memory, copies of the data for that address in other cache memories may be inconsistent with the updated data.

It is known to enforce consistency by means of a cache coherence circuit. The cache coherence circuit communicates at least the background memory addresses of updated data among the cache memories. The cache memories are provided with controllers that use this information to invalidate or update inconsistent data. Thus, if a processor subsequently addresses this data, it will have to be loaded from the background memory in the case of invalidation, or it will load updated data in the case of updates. As a result, program execution in each processor can proceed using background memory addresses of shared data, without concern for inconsistency.

However, cache coherence circuits tend to be very complex, giving rise to considerable circuit overhead and/or processing delays and even design errors.

SUMMARY OF THE INVENTION

Among others, it is an object to reduce the overhead needed to ensure consistent use of cached data.

A multiprocessing system according to claim 1 is provided. The system comprises a background memory and a plurality of processing elements, each comprising a processor core and a cache circuit coupled between the processor core and the background memory. Programs of instructions may be executed in the processor cores. During execution background memory data accessed by the programs is cached in the cache circuits. A write back monitor circuit is provided to buffer write addresses used for writing data by at least part of the processor cores. The processor cores support commands in the programs to read the buffered write back addresses from the write back monitor circuit and to invalidate cached data for write back addresses read by the commands to read the buffered write back addresses. Distinct command types (e.g. distinct opcodes) may be used for read buffered write back addresses and for invalidating respectively, in an alternative embodiment one command type may be used to make the processor core do both. In an embodiment not all such write addresses need to be invalidated. Instead the data for write addresses may be updated, for example using write data for the write address. A monitoring circuit supports the program by buffering write addresses until a command from the program to read the write address is reached.

In this way the task of ensuring cache coherence when needed can be moved to the program with little overhead. In an embodiment the processor core is a VLIW processor core. This means that instruction cycles need not be lost by dedicating them entirely to cache coherence management.

In an embodiment the write back monitor circuit is configured to detect an overflow condition when a write address is lost due to the time delay before the program asks for it. This enables the program to provide for corrective action, for example by invalidating the entire cache in the case of overflow.

In an embodiment write addresses are stored in combination with write data for that write address. This enables the processor core to perform updates instead of invalidations.

In an embodiment the write back monitor circuit may be a shared write back monitor circuit, shared by a plurality of processing elements. Alternatively, local write back monitor circuits may be used, for individual processing elements. The write back monitor circuit may comprise a buffer memory operated as a circular buffer. In the embodiment of a shared write back monitor circuit a plurality of read pointers is provided pointing to locations in this buffer memory. In an alternative embodiment the write back monitor circuit for a processing element may comprise an associative memory, addressable by the write addresses. This enables the processor core to manage coherence for selected addresses efficiently.

In an embodiment the multiprocessor system may comprise a synchronization circuit configured to synchronize execution of the programs. This makes it possible to define positions in programs where no commands to manage cache coherence are needed.

A compiler may be for generating a program for a processor core with commands to implement the task as well as commands to read buffered write back addresses from a write back monitor circuit and to invalidate cached data for the write back addresses.

BRIEF DESCRIPTION OF THE DRAWINGS

These and other objects and advantageous aspects will become apparent from a description of exemplary embodiments, using the following Figures.

FIG. 1 shows a multiprocessing system
FIG. 2 shows a further multiprocessing system
FIG. 4 shows a multiprocessing system with local write back monitor circuits

DETAILED DESCRIPTION OF EXEMPLARY EMBODIMENTS

Figure 3:
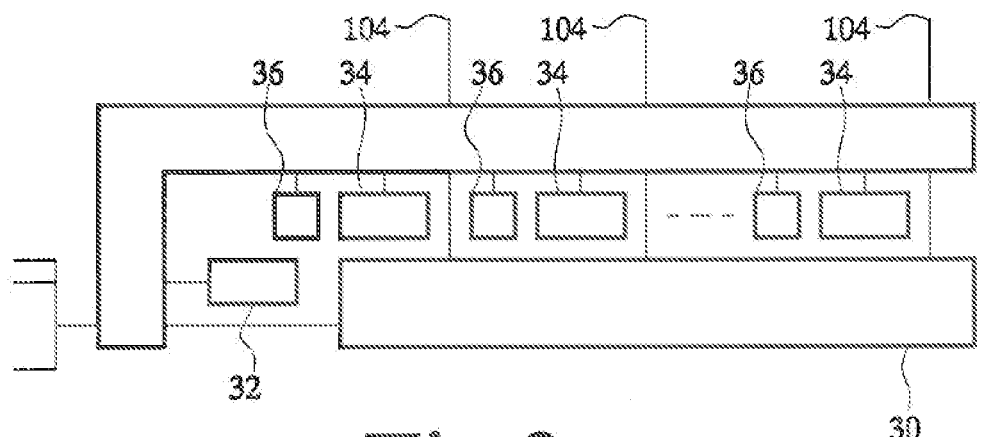
FIG. 3 shows a shared write back monitor circuit

FIG. 1 shows a multiprocessing system, comprising a plurality of processing elements 10, a background memory 12, an interface 11 between the processing elements 10 and the background memory 12 and a shared write back monitor circuit 14. In an embodiment processing elements 10, background memory 12 and shared write back monitor circuit 14 may all be part of a single integrated circuit. In another embodiment, processing elements 10 and shared write back monitor circuit 14 may be part of a single integrated circuit and background memory 12 may be external to this integrated circuit, the integrated circuit comprising interface 11 to access background memory 12.

Each processing element 10 comprises a VLIW processor core 100 and a cache circuit 102. VLIW processor cores 100 are known per se: basically a VLIW processor core 100 provides execution of instructions that may each contain a plurality of commands in parallel. Each VLIW processor core 100 may comprise a plurality of functional units, a register file and an instruction memory.

The cache circuit 102 of each processing element 10 is coupled between the VLIW processor core 100 of the processing element 10 and background memory 12. The cache circuit 102 may comprise a cache memory and a control circuit, arranged to test whether data addressed by commands from VLIW processor core 100 is present in the cache memory and to return data from the cache or load data from background memory dependent on whether the data is present.

Each cache circuit 102 has a message output coupled to shared write back monitor circuit 14. The cache circuit 102 of each processing element 10 is configured to send addresses of write transactions that it receives from the VLIW processor core 100 to shared write back monitor circuit 14. The transmission of addresses of write transactions may be performed using conventional circuits for transmitting cache coherency messages. Each VLIW processor core 100 has an input port 104 coupled to shared write back monitor circuit 14. The input port 104 is instruction accessible. This may be realized for example by mapping input port 104 to an addressable register of VLIW processor core 100. Because input port 104 is instruction accessible, the program of VLIW processor core 100 may contain instructions with a command to access input port 104.

In operation, enforcement of cache coherence during execution of a program of the VLIW processor core 100 is left to the program itself. Each VLIW processor core 100 executes respective VLIW instructions of its program successively. These instructions include commands to read data from input port 104 and commands to send signals to cache circuit 102 to invalidate cache lines. Such commands are included in the program of the VLIW processor core 100 by a compiler. The compiler may be a computer program product with a program of instructions that, when executed by a programmable computer, generates the program of the VLIW processor core 100. Alternatively the compiler may be computer configured to generate the program of the VLIW processor core 100.

Figure 1A:
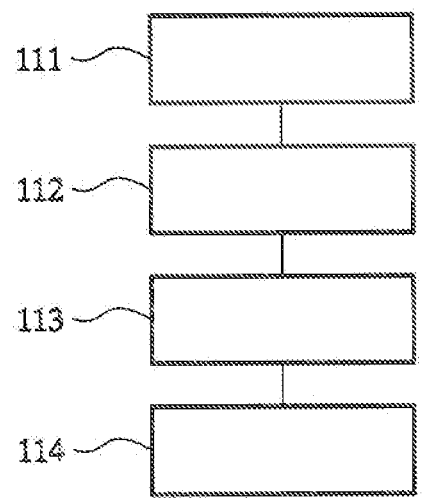
FIG. 1a shows a flow chart of operation of the compiler

FIG. 1*a* shows a flow chart of operation of the compiler. In a first step 111 the compiler of the program receives a definition of operations that have to be performed to execute a task. In a second step 112 the compiler converts this definition into a set of commands and information about data dependency among the commands. In a third step 113 the allocates registers for operand data that has to be passed between commands and the compiler places the commands in VLIW instructions, with operand and result addresses of the corresponding allocated registers. VLIW instructions each have a plurality of positions for respective commands. Although considerations of maximum execution speed would make it desirable to place instructions for executing the task at all positions, conditions imposed by data dependency often make it unavoidable to leave positions vacant. In this case, the compiler would conventionally place "no operation" commands (NOP) at these position.

In a fourth step 114 the compiler may provide for a second compilation pass, wherein commands to read data from input port 104 and commands to send signals to cache circuit 102 to invalidate cache lines are placed in at least part of the vacant positions in order to enforce cache consistency needed by the program. Thus, the VLIW processor core 100 is used to enforce cache consistency, without need for overhead circuitry to do so automatically in parallel with program execution. This is illustrated by the following example program:

instruction 1=(ADD, NOP, LDU, MUL, NOP)
instruction 2=(SUB, NOP, ADD, NOP, STR)
instruction 3=(AND, SUB, NOP, NOP, INV)
instruction 4=(NOP, SUB, JMP, LDU, NOP)
instruction 5=(NOP, NOP, NOP, NOP, NOP)
instruction 6=(INV, ADD, NOP, AND, NOP)

Herein the commands of an instruction are indicated by a series of mnemonics (ADD, MUL etc.) between brackets. As can be seen, in the example the VLIW processor core 100 is capable of executing each time five commands from a single instruction. The commands include a command indicated by LDU, to which the VLIW processor core 100 responds by reading a write address from input port 104 and writing a result to a register. The commands furthermore include a command indicated by INV, to which the VLIW processor core 100 responds by retrieving the address from the register and sending a signal to the cache circuit 102 of its processing element to invalidate a cache line with said write address.

As may be noted, two pairs of LDU, INV instructions are included in the program portion. Herein the INV instruction of the pair invalidates the cache line of the write address obtained by the LDU instruction of the pair. In an embodiment a version of the INV command may be used that also signals the processor core to perform the LDU action, and to use the result of the LDU action in the invalidation, or to provide data in the register file for a later invalidation. However, the use of distinct LDU and INV command types reduces processing overhead.

Instead of invalidation, updating may be used. In this embodiment, write back monitor circuit 14 is configured to supply write back data in combination with the write back address and the INV instruction is replaced by an instruction to update data at the write address with the write data, preferably with a command that disables renewed transmission of the write address to the write back monitor circuit. The VLIW processor core may be configured to read both a write address and write data in response to a single LDU command in the program. In an alternative embodiment, separate commands in the program may be used to read the write address and the write data respectively. This reduces the required register size and it gives the compiler the freedom to choose between rapid invalidation and slower updating, dependent on the position in the program.

By way of example, the program portion also contains a store instruction STR, which has a write address as operand. The VLIW processor core 100 responds to this instruction by writing data to cache circuit 104 in combination with the write address. In response, cache circuit 102 sends the write address to write back monitor circuit 14, optionally in combination with the write data. Write back monitor circuit 14, in turn, will subsequently supply the write address and optionally the write data to the input port of VLIW processor cores 100 of the other processing elements, when these VLIW processor cores 100 execute an LDU instruction. The transmission of the write address to write back monitor circuit 14 may be performed immediately in response to the write instruction, or it may be delayed until VLIW processor core 100 executes a "commit" command to do so. In an alternative embodiment transmission of write addresses is unrelated to store instructions. In this case a commit command of VLIW processor core 100 specifying one or more write addresses is used to trigger transmission of the write addresses to write back monitor circuit 14.

FIG. 2 shows a further multiprocessing system. In addition to the components of the shows a multiprocessing system of FIG. 1 this system comprises a synchronizing circuit 20. Synchronizing circuit 20 is configured to coordinate synchronization of execution of program portions by different processing elements 10. The model behind this is that a program of a first processing element 10 can indicate when other processing elements 10 are blocked from entering portions of their programs until the first processing element 10 gives a release to do so. Synchronization is known per se, but combined with shared write back monitor circuit 14 it enables the compiler to select program portions wherein LDU, INV instructions can be omitted because no inconsistency can occur.

Any known implementation of synchronization may be used. To implement synchronization, the VLIW processor cores 100 may be configured to execute an entry command (ENT), which causes program execution by the VLIW processor core 100 to stall, unless it receives a signal from synchronizing circuit 20 to indicate that execution can go ahead. Furthermore the VLIW processor cores 100 may be configured to execute acquire and release commands (ACQ, REL), which causes the VLIW processor core 100 to signal to synchronizing circuit 20 that it must not signal that execution can go ahead and signal that execution can go ahead respectively. In an embodiment, the entry and acquire instruction may be the same instruction, acquiring being inherent in entering. Synchronizing circuit 20 may contain a storage element for storing a flag that is set and reset by the ACQ and REL commands. The ENT command may be implemented using reading of this flag, or read-modify-write when ENT and ACQ are combined.

The following example illustrates program portions of two VLIW processor cores 100 using synchronization (..ACQ..) (..xxx..)
    (..xxx..) (..xxx..)
    (..xxx..) (..ENT..)
    (..xxx..) stalled
    (..REL..) stalled
    (..xxx..) (..xxx..)

In the example, one command from successive instructions of two VLIW processor cores 100 is shown (xxx indicating any instruction). As can be seen the first VLIW processor core 100 executes an acquire instruction and a release instruction, to send signals to synchronizing circuit 20. The second VLIW processor core 100 executes an entry instruction after execution of the acquire instruction by the first VLIW processor core 100, which has the effect that the synchronizing circuit 20 makes the second VLIW processor core 100 stalls until the first VLIW processor core 100 has executed the release instruction. If the entry instruction had been executed after the release instruction, no stalling would occur.

The acquire and release instructions may be associated with a portion of background memory 12 that is accessed only in program portions between these instructions. In this case these instructions ensure that other VLIW processor core 100 will not write to this portion of background memory 12 in the program portion between the acquire and release instructions. As a result, after a point in the program portion where the cache circuit of a processing element 10 is known in advance to be coherent, LDU and INV commands need not be included in the program.

This enables the compiler to omit LDU operations to read from shared write back monitor circuit 14 between these instructions, optionally after instructions to ensure that the cache memory is consistent after the start of program portion. For example, compilation may comprise the step of inserting acquire and release command before and after sets of commands that have been indicated as a synchronized block, and to insert instructions to load write addresses and to invalidate cache lines with those write addresses only in an initial part of the program portion between the acquire and release commands. Similarly, the compiler may place commit instructions only in a final part of the program portion between the acquire and release commands.

The compiler may adapt software cache coherence overhead dependent on the content of the program. However, it should be noted that this can also be done without synchronization, be it at the price of more complex compilation, if the compiler is configured to analyze program content in terms of use of shared memory lines, to determine where in the program cache coherence is needed in the programs.

In an embodiment, acquire, release and entry commands may relate to a single synchronization flag, for a single background memory portion. In another embodiment a plurality of flags may be used, for respective background memory portions. In this case the acquire, release and entry commands may include an operand to indicate the flag concerned, so that stalling occurs only when the indicated flag is not cleared.

When synchronization is used, this ensures that there is no need to send write addresses to write back monitor circuit 14 immediately in response to store operations. Instead, one or more commit commands may be executed before or simultaneously with execution of the release command.

Furthermore, synchronization may be used to allow the compiler to ensure that write addresses are supplied to write back monitor circuit 14 from at most one processing element at a time, so that no multiport memory or other arrangement is needed to handle multiple write addresses.

FIG. 3 shows an embodiment of shared write back monitor circuit 14, comprising a buffer memory 30, a write pointer register 32, read pointer registers 34 and overflow registers 36 for respective processing elements, and a control circuit 38. Control circuit 38 is configured to write incoming write addresses to buffer memory 30 at a location indicated by write pointer register 32 and increment write pointer register 32, looping around when the write pointer reaches a maximum value. Control circuit 38 tests whether the increment of write pointer register 32 passes any read pointer in read pointer registers 34 and if so it set the overflow register 36 for that read pointer.

On receiving a request for a write address from a processing element, control circuit 38 tests whether the overflow register 36 for the processing element is not set and the read pointer in the read pointer register 34 for that processing element is below the write pointer. If so control circuit 38 reads the write address from buffer memory 30 at the position indicated by that read pointer, increases that read pointer in the read pointer register 34 and returns the write data to the processing element.

If the overflow register 36 for the processing element is set, control circuit 38 returns a value to the processing element to indicate overflow and resets the overflow register 36. The invalidation command of the processing element uses this value to apply invalidation to its entire cache circuit. Thus, cache coherence is ensured when buffer memory 30 overflows. If the read pointer in the read pointer register 34 for the processing element equals the write pointer, control circuit 38 returns a value to the processing element to indicate that no new write addresses are available. An unused memory address may be returned for example. In response to this value the invalidation command in the processing command of that processing element does not involve invalidating any cache lines.

Control circuit 38 may be a distributed circuit, comprising circuit parts provided for respective processing elements, in combination with the read pointer registers 34 etc. Alternatively, a microcontroller may be used for example, which performs the functions of control circuit 38 under control of a local program. In an alternative embodiment part of the functions of control circuit 38 may be performed by the VLIW processor cores 100. For example, these VLIW processor cores 100 may update their respective read pointer registers 104 when they read a write address and/or they may read the overflow register 106. In another embodiment the read pointer register and/or the overflow register may even be omitted, their function being implemented by software controlled registers in the VLIW processor core 100 and the VLIW processor core 100 performing tests for overflow. This may prevent detection of some overflows, but if the program contains sufficient instructions to update the cache this need not always be a problem.

Instead of reporting overflow in response to a load instruction from the VLIW processor core 100, write back monitor circuit 14 may signal overflow directly to the cache circuit 102 of the corresponding processing element 10. The cache circuit 102, in turn may be configured to invalidate all cached data in response. In this case no overflow register is necessary and the program can be simplified. However, using a processor core command to receive information about overflow and invalidating in response to that command at a time determined by the program has the advantage that overflows that the program knows to be harmless in a particular part of the program need not lead to a slowdown of execution as a result of needless invalidation.

In an embodiment control circuit 38 stores write addresses in combination with an indication of the processing element at the source of the write address. In this case, before returning a write address, control circuit 38 checks whether write address originated from the processing element that requested a write address. If so control circuit 38 increments the read pointer value for that processing element and repeats for the next read pointer value. Alternatively, the processing elements may be configured or programmed to avoid invalidation of cache lines in response to write addresses that originated from themselves.

In an embodiment a VLIW processor core 100 may be configured to support a purge instruction and control circuit 38 is configured to receive an indication from the VLIW processor core 100 that such an instruction is executed. In response the control circuit 38 set the read pointer for the processing element of the VLIW processor core 100 to the write pointer value. In the VLIW processor core 100 this instruction may be combined with invalidation of the entire cache. In this way instructions to bring the cache up to date can be omitted at selectable points from the program, for example where it is known that the current content cache will not be used further.

Optionally, buffer memory 30 may store write data in combination with write addresses, in which case this write address can be returned with the write data.

FIG. 4 shows an embodiment wherein local write back monitor circuits 40 are included in the processing elements 10. In this embodiments, write addresses are distributed from the cache circuit 102 of each processing element to local write back monitor circuits 40 of all other processing elements 10. The local write back monitor circuit 40 of each processing element 10 is coupled to the input port of the processing element.

In this embodiment local write back monitor circuits 40 may be simplified versions of shared write back monitor circuit 14, with a single read pointer register and overflow register. Writing write data from its own processing element may be avoided by disabling writing when the processing element provides such write data, or by simply not connecting the processing element to the input of its own local write back monitor circuit 40. Instead of overwriting write addresses on overflow, new write addresses may simply not be written to the buffer when overflow occurs.

Alternatively, instead of the circular buffer mechanism used by this local write back monitor circuit, more complicated storage of write addresses may be used. In one embodiment an associative memory (e.g. a set associative memory) may be used in a local write back monitor circuit 40. This makes it possible to address the local write back monitor circuit with background memory addresses or parts thereof, in order to obtain information whether the address has been updated, or a cache line corresponding to the address part has been updated and optionally the updated data. In this case, the LDU instruction may include such an address or address part, to enable the VLIW processor core 100 to use the addresses of cache lines in its cache to query whether the local write back monitor circuit 40 has received write addresses in these cache lines have been received and optionally to return the updated data. This enables the VLIW processor core 100 to invalidate or update those cache lines.

When this associative memory overflows (i.e. when no free space can be found for a write address) local write back monitor circuit 40 records this and subsequently the entire content of cache circuit 104 is invalidated, for example under control of a command executed by VLIW processor core 100. A purge instruction may be supported, the local write back monitor circuit 40 being configured to empty the associative memory in response to the purge instruction.

In an embodiment invalidation may be implemented entirely using updates of data in the cache line. This has the disadvantage that more information must be kept for individual addresses in the cache lines, but it may make complete invalidation of cache lines unnecessary and it may make a separate invalidation command unnecessary, invalidation being performed entirely by means of updates.

Although an embodiment has been shown with VLIW processor cores, which has the advantage that unused positions for commands in instructions can be used to manage cache coherence, it should be appreciated that instruction based management of cache coherence can also be applied to other types of processor cores. In any processor the number of instructions involved in cache coherence can be kept limited by using synchronization, so that instructions for cache coherence need are only needed in a limited program portion before and after acquire and release instructions. In the case of scalar or pipelined processors empty instruction issue slots or pipeline stages may be filled with instructions to manage cache coherence. Not all of the processing elements need to be of the same type. Processing elements may be added that do not use caching. In this case, such processing elements may only supply input to the write back monitor circuit or monitor circuits.

The cache circuits 102 may be configured to perform other cache management functions, such as the selection of cache lines for eviction, fetching of new cache lines from background memory 12, write back or write through to background memory 12 etc. Alternatively, part of all of these functions may be performed under control of commands in the program of VLIW processor core 100. As described, cache circuits 102 are configured at least to execute invalidation commands directed at specific cache lines in response to signals from the VLIW processor core. Optionally cache circuits 102 may be configured to supply information about background addresses of cached in response to execution of instructions to that effect by the VLIW processor core 100.

As will be appreciated the illustrated circuits manage cache coherence using a mix of hardware dedicated to cache coherence and software executed by the processor core. The dedicated hardware is kept simple. Its main function is to buffer write addresses autonomously during program execution and to provide the write addresses when instructions executed by the processor core call for them. More complicated hardware is avoided. The responsibility for cache coherence is moved to the compiler, which is enabled to use free space in the program and/or information about the points in the program where cache coherence is needed to implement cache coherence with a minimum of execution overhead. As a result, coherence is not autonomously ensured, as in conventional cache systems, but left to the program. When overflow conditions are detected the program may not even need to ensure that it handles all cache updates.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A multiprocessor system, comprising:
an interface to a background memory;
a plurality of processing elements, each comprising a processor core and a cache circuit, coupled between the processor core and the interface for caching background memory data accessed by a program of the processor core; and
a write back monitor circuit configured to buffer write addresses used for writing data by at least part of the processor cores, the processor core of at least one of the processing elements being configured to support commands from the program to read write back addresses from the write back monitor circuit and to invalidate cached data in the cache circuit of the at least one processing element for the write back addresses.

2. A multiprocessor system according to claim 1, wherein the processor core of said at least one of the processing elements is a VLIW processor core, configured to execute instructions that each comprise a plurality of commands for mutually parallel execution, the commands including the commands to read write back addresses and to invalidate cached data.

3. A multiprocessor system according to claim 1, wherein the write back monitor circuit is configured to detect an overflow condition when a lost write address is removed from the buffer before the lost write address is read by the program, or the lost write address is not written into the buffer, and to signal the overflow condition to the processor core.

4. A multiprocessor system according to claim 3, wherein the processor core of said at least one of the processing elements is configured to apply the command to invalidate to all cached data in the cache circuit in response to said signaling of the overflow condition.

5. A multiprocessor system according to claim 1, wherein the write back monitor circuit is configured to store each write address in combination with write data for that write address.

6. A multiprocessor system according to claim 1, wherein the processor core of said at least one of the processing elements comprises a program memory with a program including commands to access the cache circuit using background memory addresses as well as the commands to the commands to read write back addresses and the commands to invalidate cached data for the write back addresses read by the commands to read write back addresses.

7. A multiprocessor system according to claim 1, wherein the write back monitor circuit is shared by the plurality of processing elements.

8. A multiprocessor system according to claim 7, wherein the write back monitor circuit comprises a buffer memory operated as a circular buffer and read pointers pointing to locations in the buffer memory are provided for respective ones of the processing elements.

9. A multiprocessor system according to claim 1, further comprising a plurality of write back monitor circuits, each for a respective one of the processing elements.

10. A multiprocessor system according to claim 9, wherein at least one of the plurality of write back monitor circuits comprises an associative memory, addressable by the write addresses.

11. A multiprocessor system according to claim 9, wherein at least one of the plurality of write back monitor circuits comprises a buffer memory operated as a circular buffer.

12. A multiprocessor system according to claim 1, further comprising a synchronization circuit configured to stall execution of the program of at least one of the processing elements in response to a synchronization command in that program until a synchronization condition is met.

13. A method of operating a multiprocessor system with a background memory and a plurality of processing elements, each comprising a processor core and a cache circuit coupled between the processor core and the background memory, the method comprising:
executing programs of instructions in the processor cores;
caching background memory data accessed by the programs in the cache circuits;
using a write back monitor circuit to buffer write addresses used for writing data by at least part of the processor cores,
executing commands from the programs to read the buffered write back addresses from the write back monitor circuit; and
executing commands from the programs to invalidate cached data for the write back addresses read by the commands to read the buffered write back addresses.

14. A compiler for generating a program for a processor core in a multiprocessing system, the compiler being configured to
receive a definition of a task;
generate a program with commands to implement the task; and
add commands to said program to read buffered write back addresses from a write back monitor circuit and to invalidate cached data for the write back addresses read by the commands to read the buffered write back addresses.

15. A compiler according to claim 14, wherein the processor core is a VLIW processor core with instructions that each contain a plurality of positions for commands, the compiler being configured to mix the commands to implement the task and the commands to read buffered write back addresses from a write back monitor circuit and to invalidate cached data for the write back addresses read by the commands to read the buffered write back addresses in the instructions.

* * * * *